(12) United States Patent
Düll et al.

(10) Patent No.: US 11,536,302 B2
(45) Date of Patent: Dec. 27, 2022

(54) FASTENING CLIP FOR FASTENING AN ATTACHMENT COMPONENT ON A CARRIER EDGE

(71) Applicant: ILLINOIS TOOL WORKS INC., Glenview, IL (US)

(72) Inventors: Florian Düll, Röttingen (DE); Jan Müller, Würzburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/289,579

(22) PCT Filed: Oct. 31, 2019

(86) PCT No.: PCT/US2019/058993
§ 371 (c)(1),
(2) Date: Apr. 28, 2021

(87) PCT Pub. No.: WO2020/096846
PCT Pub. Date: May 14, 2020

(65) Prior Publication Data
US 2022/0010824 A1    Jan. 13, 2022

(30) Foreign Application Priority Data

Nov. 5, 2018    (DE) ..................... 10 2018 127 519.6

(51) Int. Cl.
*F16B 2/24* (2006.01)
*F16B 5/06* (2006.01)
*B60R 16/00* (2006.01)

(52) U.S. Cl.
CPC ............ *F16B 2/245* (2013.01); *F16B 5/0635* (2013.01); *B60R 16/00* (2013.01)

(58) Field of Classification Search
CPC ...... F16B 2/245; F16B 5/0635; F16B 21/075; F16B 5/0657; F16B 5/065; F16B 5/0664;
(Continued)

(56) References Cited

U.S. PATENT DOCUMENTS 539,127 A    5/1895    Gump
2,385,209 A    9/1945    Joyce
(Continued)

FOREIGN PATENT DOCUMENTS

BE    1009402    3/1997
CN    102016333 A    4/2011
(Continued)

OTHER PUBLICATIONS

PCT, International Search Report and Written Opinion, International Application No. PCT/US2019/058993; dated Feb. 25, 2020, 11 pages.

*Primary Examiner* — Robert Sandy
*Assistant Examiner* — Rowland Do
(74) *Attorney, Agent, or Firm* — Thompson Hine LLP (57) ABSTRACT

A fastening clip for fastening an attachment component on a carrier edge (50, 60), in particular in a vehicle, includes a clip body (10) with a main side (12) and holding legs (14, 16) which lie opposite one another and extend away from the main side (12), the holding legs (14, 16) delimiting, together with the main side (12), a receiving space (18) with an inlet opening (20) for the carrier edge (50, 60), wherein at least one of the holding legs (14) is adjoined by a holding section (22) which is bent over in the direction of the main side (12) of the clip body (10) and has at least one holding projection (24) which protrudes into the receiving space (18) in the direction of the opposite holding leg (16).

10 Claims, 5 Drawing Sheets

(58) Field of Classification Search
CPC ...... B60J 10/18; Y10T 24/307; Y10T 24/309; Y10T 428/24198
See application file for complete search history.

(56) References Cited

U.S. PATENT DOCUMENTS

| | | | | |
|---|---|---|---|---|
| 3,208,119 | A * | 9/1965 | Seckerson | F16B 5/121 52/712 |
| 4,188,765 | A * | 2/1980 | Jackson | B60J 10/33 49/490.1 |
| 4,271,634 | A * | 6/1981 | Andrzejewski | B60J 10/18 24/562 |
| 4,348,443 | A * | 9/1982 | Hein | B60J 10/80 52/716.5 |
| 4,542,610 | A * | 9/1985 | Weimar | B60J 10/18 D25/124 |
| 4,902,549 | A * | 2/1990 | Bright | B60J 10/84 52/716.5 |
| 4,959,081 | A * | 9/1990 | Mathellier | B60J 10/18 52/716.5 |
| 5,403,632 | A * | 4/1995 | Mesnel | B60J 10/15 49/440 |
| 5,598,609 | A * | 2/1997 | Asami | F16B 5/0635 24/295 |
| 6,548,143 | B1 * | 4/2003 | Heller | B60J 10/18 49/490.1 |
| 6,665,914 | B2 * | 12/2003 | Ogawa | F16B 5/06 24/297 |
| 6,679,003 | B2 * | 1/2004 | Nozaki | B60J 5/0402 49/495.1 |
| 7,257,924 | B2 * | 8/2007 | Kounobu | B60J 10/16 49/490.1 |
| 7,552,516 | B2 * | 6/2009 | Okada | F16B 21/075 24/453 |
| 8,683,662 | B2 * | 4/2014 | Cooley | F16B 5/0664 24/453 |
| 8,769,877 | B2 * | 7/2014 | Baratin | B29D 99/0053 49/490.1 |
| 9,327,585 | B2 * | 5/2016 | Hamada | B60J 10/84 |
| 2004/0016087 | A1 | 1/2004 | Osterland | |
| 2004/0111973 | A1 * | 6/2004 | Moisy | B60J 10/88 49/490.1 |
| 2005/0000063 | A1 | 1/2005 | De Azevedo | |
| 2007/0050955 | A1 * | 3/2007 | Hansen | F16B 5/0614 24/297 |
| 2008/0229550 | A1 * | 9/2008 | Elsner | F16L 3/233 24/16 PB |
| 2013/0305612 | A1 * | 11/2013 | Murree | B60J 10/16 49/489.1 |
| 2015/0089878 | A1 * | 4/2015 | Otsuka | B60J 10/88 49/440 |
| 2015/0159778 | A1 * | 6/2015 | Kuhm | H02G 3/32 248/74.2 |
| 2017/0217069 | A1 * | 8/2017 | Hirokawa | B60J 10/33 |
| 2018/0009149 | A1 * | 1/2018 | Iwamoto | B29C 53/02 |
| 2019/0048911 | A1 * | 2/2019 | Bidlake | F16B 21/086 |
| 2019/0210439 | A1 * | 7/2019 | Williamson | B60J 10/76 |

FOREIGN PATENT DOCUMENTS

| | | |
|---|---|---|
| DE | 69409783 T2 | 4/1998 |
| EP | 1650365 | 4/2006 |
| FR | 2924187 | 5/2009 |
| JP | 2012167694 A | 9/2012 |
| WO | WO-2009/071820 A2 | 6/2009 |

* cited by examiner

FASTENING CLIP FOR FASTENING AN ATTACHMENT COMPONENT ON A CARRIER EDGE

TECHNICAL FIELD

The invention relates to a fastening clip for fastening an attachment component on a carrier edge, in particular in a vehicle, comprising a clip body with a main side and holding legs which lie opposite one another and extend away from the main side, the holding legs delimiting, together with the main side, a receiving space with an inlet opening for the carrier edge.

BACKGROUND

Such fastening clips serve for mounting an attachment component, such as for example a line, on an edge of a carrier component. The line may be for example a fluid-carrying line, such as a hydraulic line, or an electrical line. The carrier component may be a vehicle component, for example in a passenger compartment or engine compartment of a vehicle. In the state in which it is mounted on the carrier edge, the clip body of the fastening clip reaches with both its holding legs around the carrier edge from opposite sides. In this case, holding projections configured on the holding legs act on the surfaces opposite one another of the carrier edge in a way similar to barbs. The holding projections usually extend into the receiving space such that they are inclined obliquely in relation to the main side of the clip body in the direction of the respectively opposite holding leg. In the case of known fastening clips, the holding projections are usually produced by making cuts in the holding leg and subsequently bending the cut elements into the receiving space. When the fastening clip is mounted on a carrier edge, the latter is received in the receiving space by entering the inlet opening, whereby the holding projections are bent in the direction of the holding leg respectively supporting them. Depending on the thickness of the carrier edge which is received in the receiving space, the holding projections are in this case bent back to different extents in their respective holding leg. Especially in the case of relatively thick carrier edges, the holding projections must be bent to a great extent, which does lead to a relatively great clamping force being exerted on the carrier edge by the holding projections, but requires a great mounting force. In the case of relatively thin carrier edges, bending of the holding projections takes place to a correspondingly lesser extent, which does allow a carrier edge to be introduced while expending a relatively low mounting force, but leads to a lower holding force.

SUMMARY

Proceeding from the prior art explained, the invention is based on the object of providing a fastening clip which can apply a uniform holding force for carrier edges of different thicknesses.

The invention achieves the object by a fastening clip according to claim 1. Advantageous refinements are the subject of the subclaims, the description and the figures.

In the case of the fastening clip according to the invention of the type mentioned at the beginning, at least one of the holding legs is adjoined by a holding section which is bent over in the direction of the main side of the clip body and has at least one holding projection which protrudes into the receiving space in the direction of the opposite holding leg.

As already mentioned at the beginning, in a mounted state of the fastening clip the clip body receives the carrier edge in its receiving space. The at least one holding projection thereby acts on one of the surfaces of the carrier edge. With its main side and the holding legs extending from it, the clip body may in particular have a U shape or a V shape, the inner space of this shape defining the receiving space. The open end of this U shape or V shape can form the inlet opening. The inlet opening of the clip body is in particular configured as lying opposite the main side. As likewise already referred to at the beginning, the at least one holding projection may in particular extend into the receiving space at an angle, with one directional component toward the opposite holding leg and with one directional component perpendicular thereto, toward the main side. Consequently, for a carrier edge that is received in the receiving space, the holding projection can counteract pulling-off of the fastening clip from the carrier edge in a way similar to a barb. The clip body may in particular consist of a metal.

According to the invention, it is provided that at least one of the holding legs has a holding section which extends from the holding leg such that it is bent over in the direction of the main side of the clip body and bears the holding projection. Bent over means that the holding section continues the holding leg in such a way that a reversal of direction is obtained for the course followed by the holding leg. Starting from the main side of the clip body, the holding leg first extends away from the main side and then toward the main side again via the holding section. The holding section may for example form a C shape, a U shape or a V shape, in particular together with the holding leg. The holding section in this case extends in particular in such a way that an inner space delimited by the holding section, and possibly the holding leg, is open in the direction of the main side of the clip body. The holding leg may have a plurality of holding sections which are bent over in the direction of the main side, each one of which can in particular form at least one holding projection. Also, both holding legs may have holding sections which are bent over in the direction of the main side of the clip body, extend from the respective holding leg and in each case bear at least one holding projection. Also, just one holding leg may have a holding section according to the invention, which extends from the holding leg in a bent-over manner, with a holding projection arranged on it, while the opposite holding leg has at least one holding projection which extends from the holding leg into the receiving space directly—that is to say without a holding section bent over in the direction of the main side.

As a result of the holding section extending in a bent-over manner in the direction of the main side and the holding projection extending from said holding section in the direction of the opposite holding leg, at least a double bend is produced. The bent-over holding section may have a first bend and the holding projection configured on the holding section may have a second bend, the curvatures of which may differ, in particular in being either positive or negative. In principle, the holding section may however also have a plurality of bends, for example be bent in a W-shaped manner. On account of the bent-over form of the holding section—that is to say on account of the first bend—a particularly high elastic deformability of the holding leg is achieved. When a carrier edge is introduced into the receiving space through the inlet opening, the holding projection comes into contact with one of the surfaces of the carrier edge, whereby the bent-over holding section is elastically deformed in such a way that the holding projection is bent toward the holding leg bearing it and away from the holding leg lying opposite. The bent-over holding section is in this case elastically deformable over a wide range and allows easy mounting for carrier edges of different thicknesses, with a relatively uniformly low mounting force. In particular, carrier edges with relatively high thicknesses can also be easily mounted in this way. What is more, on account of the flexibility of the bent-over holding section, with a carrier edge received in the receiving space, the holding projection configured on the holding section is bent toward the holding section to a lesser extent, that is to say is flattened to a lesser extent. On account of the elastic deformability of the bent-over holding section, however, a sufficient clamping force continues to be exerted on the carrier edge. Moreover, the holding projection protruding into the receiving space still acts on the surface of the carrier edge at a relatively steep angle even in the case of relatively thick carrier edges. Consequently, even in the case of relatively thick carrier edges, a high holding force continues to be produced. For the reasons mentioned, even relatively thin carrier edges can however be held with a sufficiently high holding force and continue to be introduced into the fastening clip with a low mounting force. In fact, the inventors were able to establish that the fastening clip according to the invention can, in the final analysis, produce substantially the same holding forces for all carrier edges of different thicknesses that can be received in the receiving space. Consequently, in the final analysis, the fastening clip according to the invention allows easy mounting with low mounting forces and a secure hold by uniformly high holding forces for all carrier edges for which it is intended and suitable.

According to one configuration, the at least one holding projection extends from the free end of the holding section. The bent-over holding section extending from the holding leg has in particular a first end, which is connected to the holding leg, and a second, free end. According to the present configuration, the holding projection is arranged at the free end. The at least one holding projection may in other words therefore adjoin the free limb of the bent-over holding section.

According to one configuration, the bent-over holding section extends from the free end of the holding leg. The free end of the holding leg refers here to the end of the holding leg remote from the main side of the clip body. According to this configuration, consequently the holding leg can extend away from the main side and have at its free end, extending away from the main side, the bent-over holding section, or merge into it. Also, a plurality of bent-over holding sections may adjoin the free end of the holding leg. Such a holding section can be produced particularly easily, in particular by bending back the free end of the holding leg into the receiving space.

According to one configuration, the bent-over holding section adjoins the holding leg by way of a simple bend. The holding section may in particular therefore have just one bend. The holding section may for example form a C shape, a U shape or a V shape, which all realize one bend. As already referred to above, the holding section in this case extends in particular in such a way that an inner space delimited by the holding section, and possibly the holding leg, is open in the direction of the main side of the clip body. As already referred to above, the holding projection arranged on the holding section may follow a course by way of a further, different bend, which is different in particular in terms of being positive or negative. According to one configuration, the holding section may adjoin the holding leg in a U-shaped manner, in particular describe the U-shape together with the holding leg. According to a further configuration, the holding section may adjoin the holding leg at an angle of about 180°. The bent-over holding section may therefore describe a bending angle of about 180°, at least in a position of the clip body in which it is not mounted on a carrier edge, that is to say in a non-deformed state of the at least one holding projection. In particular, at least in a non-deformed state, the limbs lying opposite one another of a U-shaped holding section may run parallel to one another. Especially with such an angle, a low mounting force can be achieved, and at the same time a high holding force of the holding projection connected to the holding section.

According to one configuration, the holding projection configured on the bent-over holding section is a first holding projection and its holding leg is a first holding leg, the second holding leg which lies opposite the first holding leg having at least one second holding projection which extends in the direction of the first holding leg. As already explained above, therefore both holding legs may have holding projections, the holding projections extending in each case in the direction of the opposite holding leg, in particular at an angle. Also the second holding projection may be configured on a second bent-over holding section which extends from the second holding leg to the main side. In particular, the at least one second holding projection may however also be arranged on the second holding leg directly, that is to say without such a bent-over holding section. For example, the at least one second holding projection may be configured by making a cut in the surface area of the second holding leg and subsequently bending this area into the receiving space, as in the prior art described at the beginning. In this way, an asymmetric design of the fastening clip can be produced. As the inventors have established, a sufficiently high and uniform holding force can be achieved for carrier edges of different thicknesses by such an asymmetric design. According to one configuration in this respect, the at least one first holding projection and the at least one second holding projection are configured to come into contact at a different spacing from the inlet opening with a carrier edge which is introduced through the inlet opening into the receiving space. This may be achieved for example by the holding projections being arranged at a different spacing from the inlet opening. The holding projections of the holding legs which lie opposite one another are consequently also arranged at a different spacing from the main side of the clip body. As a result of this configuration, an asymmetric engagement of holding projections opposite one another on the surfaces of a carrier edge received in the receiving space is achieved. As the inventors have established, this achieves the effect of a greater holding force, and consequently a more stable hold, of the carrier edge in the fastening clip, in particular by a greater wedging of the carrier edge in the receiving space.

According to one configuration, a plurality of bent-over holding sections adjoin the holding leg, the holding sections in each case having a holding projection. As mentioned above, the holding sections may in particular be configured at the free end of the holding leg. A plurality of such holding projections can achieve the effect of acting particularly reliably on the surface of the carrier edge. According to a configuration in this respect, the holding projections configured on the holding sections are configured to come into contact at a different spacing from the inlet opening with the carrier edge which is to be introduced through the inlet opening into the receiving space. Therefore, as explained above, not only the holding projections of the holding legs which lie opposite one another may come into contact at a different spacing from the inlet opening with the carrier edge, but also the holding projections arranged on the same holding leg. This may in principle also apply to holding projections not configured on the holding sections. Thus, the bent-over holding sections may extend to different extents in the direction of the main side, for example limbs of the holding sections bent over in a U-shaped manner supporting the respective holding projection may extend to different extents in the direction of the main side of the clip body. Also, the holding projections may extend to different extents in the direction of the opposite holding leg, in particular at an angle. This achieves the effect that the holding projections of a holding leg act on at least one of the surfaces at different longitudinal positions between the inlet opening and the main side of the clip body. This leads to a particularly secure hold.

According to one configuration, the fastening clip comprises a carrying section for supporting the attachment part. The carrying section may be in particular a line holder for receiving for example a fluid-carrying line, such as a hydraulic line, or an electrical line, such as an electric cable. The carrying section may for example consist of plastic and in particular be configured separately from the clip body. The clip body itself may in particular consist of a metal. Adjoining the carrying section there may be configured a receiving section, in particular likewise of plastic, for example in one piece with the carrying section, the receiving section receiving the clip body. Consequently, the entire clip body may be arranged within the receiving section.

The invention also relates to a system comprising a carrier edge and a fastening clip according to the invention, the carrier edge being received in the receiving space of the clip body. The at least one holding projection which is configured on the bent-over holding section acts here on a first surface of the carrier edge. The bent-over holding section is elastically bent away from the opposite holding leg by the carrier edge, in particular together with the adjoining holding projection. The carrier edge may lie flat against the opposite holding leg with its second surface, which is opposite from the first surface and is facing the opposite holding leg. The carrier edge may be held in the receiving space of the clip body from one side by the holding projection held on the holding section, which is according to the invention bent over in the direction of the main side, and on the other side by static friction on the opposite holding leg. However, the opposite holding leg may also have holding projections. According to one configuration in this respect, the holding projection configured on the bent-over holding section is a first holding projection and its holding leg is a first holding leg, the second holding leg which lies opposite the first holding leg having at least one second holding projection which extends in the direction of the first holding leg. As already explained above, both holding legs may have holding projections. On at least one of the holding legs, at least one holding projection is arranged on one of the holding sections bent over according to the invention. According to a further configuration in this respect, the at least one first holding projection and the at least one second holding projection are in contact with the carrier edge at a different spacing from the inlet opening. As likewise already explained above, in this way an asymmetric engagement of the holding projections of the holding legs which lie opposite one another can be achieved on the carrier edge from opposite sides. This leads to a particularly high holding force on account of an improved wedging.

BRIEF DESCRIPTION OF THE DRAWINGS

A configuration of the invention is explained below on the basis of figures, in which schematically.

Unless otherwise indicated, hereinafter the same designations refer to the same items

DETAILED DESCRIPTION

Figure 1:
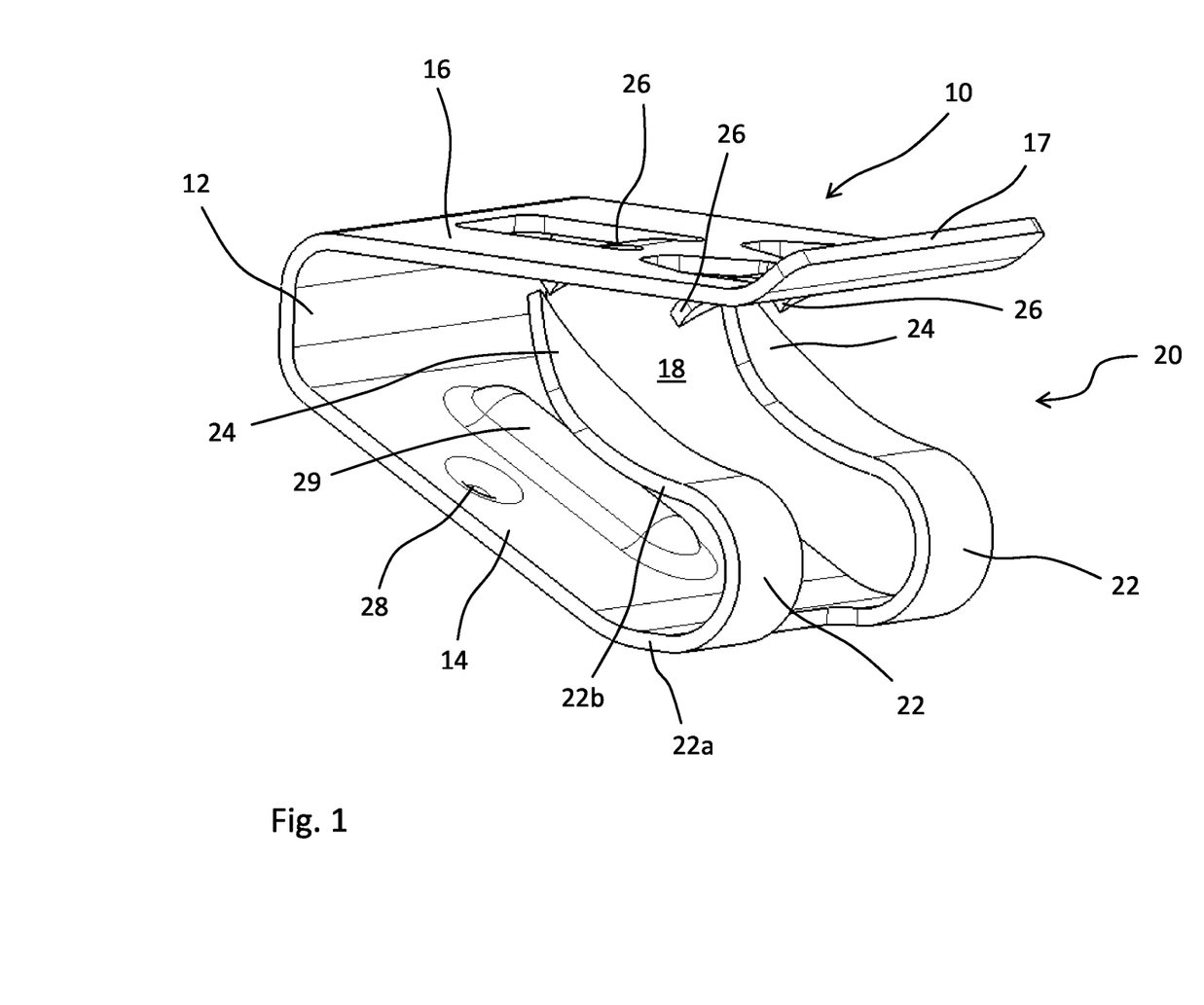
FIG. 1 shows a clip body of a fastening clip according to the invention in a perspective view.

In FIG. 1, a clip body 10 of a fastening clip according to the invention can be seen, the clip body 10 having a main side 12 and two holding legs 14, 16 which lie opposite one another and extend away from the main side 12. The clip body 10 is substantially a U shape or a V shape, with the main side 12 as the base of the U or of the V and with the first holding leg 14 and the second holding leg 16 as limbs of the U or V. A receiving space 18 of the clip body 10, which has an inlet opening 20 for a carrier edge of a carrier component, is delimited by the main side 12 and the holding legs 14, 16.

The first holding leg 14 is connected by one end to the main side 12 and has at its opposite free end two holding sections 22, which are bent over in a U-shaped manner and adjoin the first holding leg. The holding sections 22 extend in this case at an angle of about 180° from the first holding leg 14, whereby two limbs 22a, 22b lying opposite one another of the holding sections 22 run substantially parallel to one another. The bent-over holding sections 22 are open in the direction of the main side 12 or of the receiving space 18 and are spaced apart from one another along the width of the first holding leg 14. The holding sections 22 are in this case bent over with respect to the first holding leg 14 in such a way that, starting from the main side 12, the first holding leg 14 first extends away from the main side 12 and then, due to a reversal of direction, points once again toward the main side 12 via the bent-over holding sections 22. Respectively arranged on the holding sections 22 is a holding projection 24, the holding projections 24 being located in each case adjoining the limbs 22b at the free ends of the holding sections 22. The holding projections 24 in this case protrude into the receiving space 18 at an angle in the direction of the opposite, second holding leg 16, with one directional component toward the second holding leg 16 and one directional component toward the main side 12. Consequently, a double bend is produced in each case—on the one hand by the bend of the holding section 22 bent over in a U-shaped manner between the limbs 22a and 22b, that is to say the base of the U formed by the respective holding section 22, and also by the bend of the respective holding projection 24 extending from the respective holding section 22 in the direction of the opposite second holding leg 16.

The second holding leg 16 has in the present exemplary embodiment three holding projections 26, which extend into the receiving space 18 directly from the second holding leg 16 in the direction of the first holding leg 14. The holding projections 26 are formed here by making cuts in the second holding leg 16 and subsequently bending these cuts inward in the direction of the receiving space 18. The second holding leg 16 has an end connected to the main side 12 and an opposite free end, to which there extends a bearing section 17 that is at an angle to the second holding leg 16.

Figure 2:
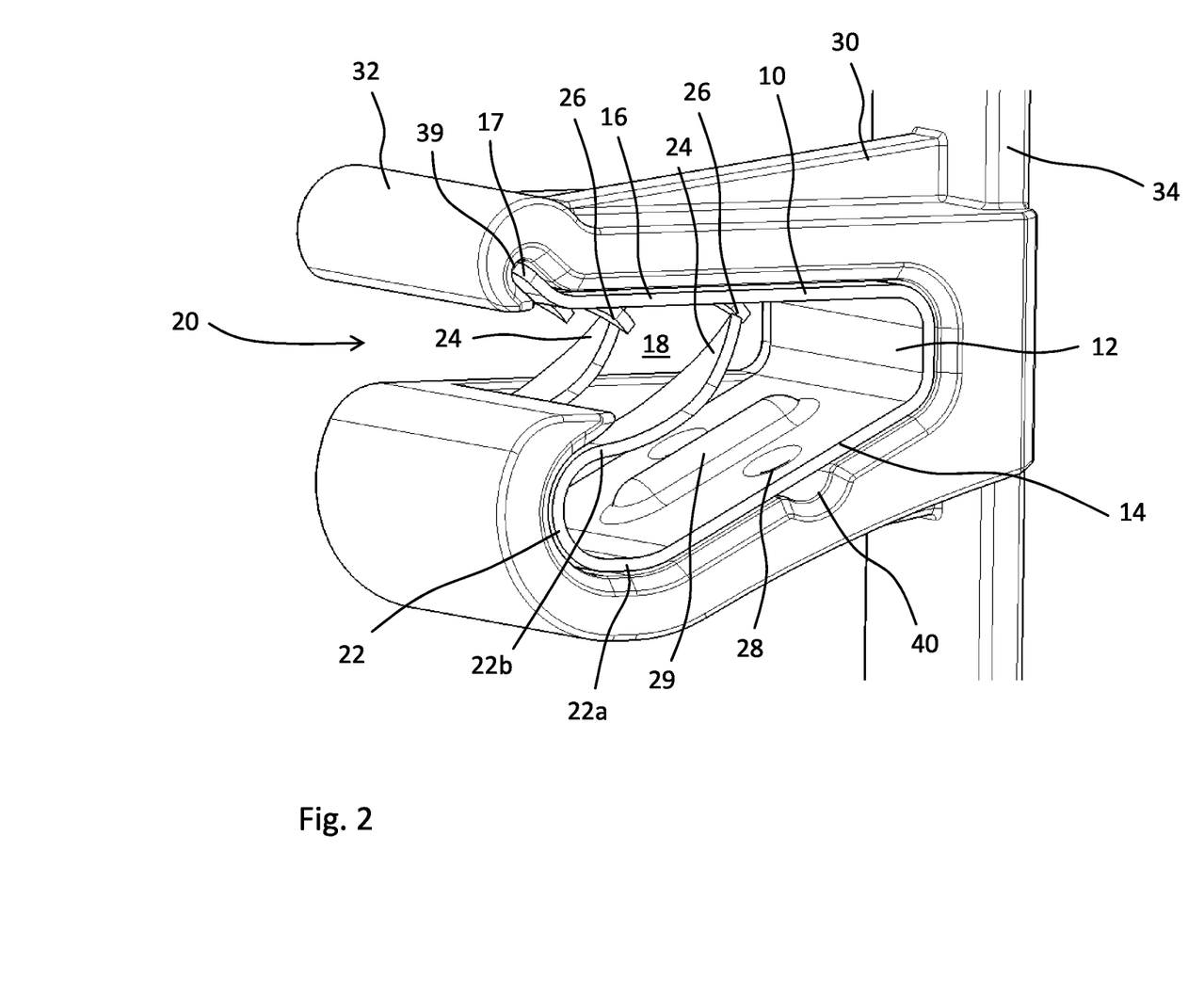
FIG. 2 shows a fastening clip according to the invention together with the clip body from FIG. 1.
Figure 3:
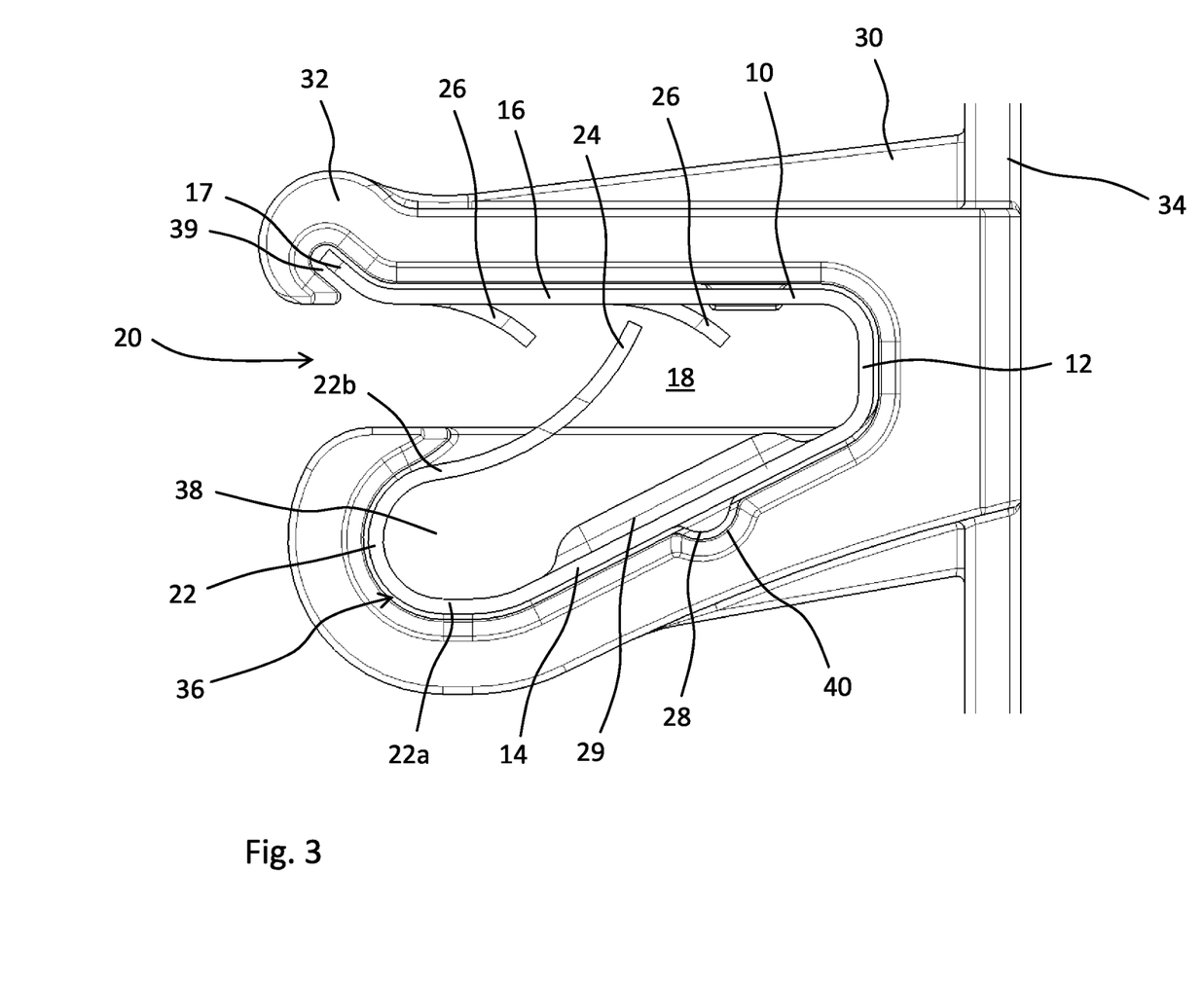
FIG. 3 shows the fastening clip from FIG. 2 in a side view.

In FIGS. 2 and 3, the clip body 10 has been received in a receiving section 32 of a line holder 30. The line holder 30 also comprises a carrying section 34 which adjoins the receiving section 32 and is intended for attaching a line that is not shown. The line may for example be held by way of one or more cable ties arranged on the carrying section 34. The line holder 30 is in particular produced in one piece from a plastic, for example by the plastics injection-moulding process. The clip body 10 is in particular formed from a metal. The receiving section 32 has a lateral push-in opening 36 and a delimiting wall 38 opposite the push-in opening. The clip body 10 can be pushed into the receiving section 32 through the push-in opening 36 until it comes up against the delimiting wall 38. Two circular elevations 28 in the first holding leg 14 thereby enter a transverse groove 40 of the receiving section 32. The bearing section 17 extending from the second holding leg 16 has also been received in a niche 39 of the receiving section 32. As a result, a secure hold of the clip body within the receiving section 32 is achieved. In particular, force occurring when there is a deformation of the clip body taking place due to the introduction of a carrier edge into the clip body can be dissipated into the line holder 30. For stabilizing the clip body 10, also configured on the first holding leg 14 is a stiffening rib 29, which runs between the main side 12 and the free end of the first holding leg 14 and is curved convexly into the receiving space 18.

Figure 4:
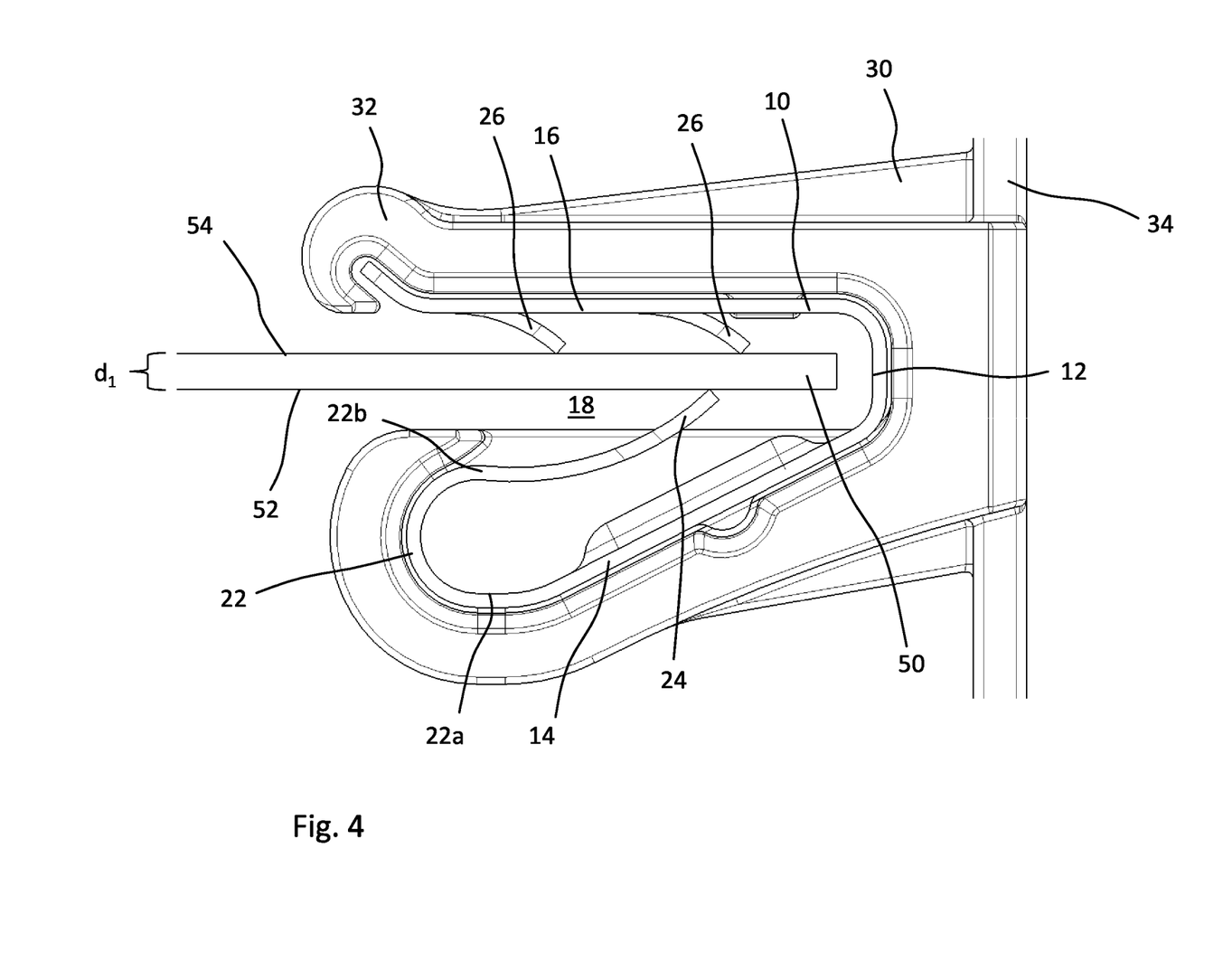
FIG. 4 shows the fastening clip from FIG. 3 with a first carrier edge received in the receiving space.

FIG. 4 shows the fastening clip from FIG. 3 with a first carrier edge 50 received therein. The carrier edge 50 has a relatively small first thickness $d_1$. The holding projections 24 act on the carrier edge 50 on a first surface 52 and the holding projections 26 on a second surface 54 which is opposite from the first surface 52. The bent-over, flexible holding sections 22 are elastically deformed by the carrier edge 50. The first holding projections 24 are deformed away from the opposite second holding leg 16, and consequently toward the first holding leg 14, and the limb sections 22b are respectively deformed in the direction of their opposite limb sections 22a. On account of the bent-over holding sections 22, the first holding projections 24 are mounted more flexibly than the second holding projections 26, therefore have a greater freedom of movement. Thus, in the case of the exemplary embodiment in FIG. 4, the holding sections 22 yield quite a lot in spite of the relatively thin carrier edge 50. On account of the elastic deformability of the holding sections 22, the carrier edge 50 can thus be pushed into the receiving space 18 through the inlet opening 20 by applying relatively low mounting forces. Nevertheless, a secure hold is achieved by the holding projections 24, 26, since the holding projections 24 and also the holding projections 26 can retain quite a steep angle in relation to the respective surfaces 52, 54 on account of the elastic deformability of the holding sections 22. Also contributing to this is the fact that the holding projections 24 come into contact at a different spacing from the inlet opening 20 with the carrier edge 50 in comparison with the holding projections 26 and that the holding projections 26 likewise come into contact at a different spacing from the inlet opening 20 with the carrier edge 50 in comparison with one another. This is achieved by an arrangement of the holding projections 24 and 26 at a different spacing from the inlet opening 20. As a result, an asymmetric action on the opposite surfaces 52, 54 of the carrier edge 50 takes place, and consequently a greater wedging, and consequently an increase of the holding forces. Moreover, on account of the elastic deformability of the holding sections 22, an adequate clamping force can be exerted also on the carrier edge 50.

Figure 5:
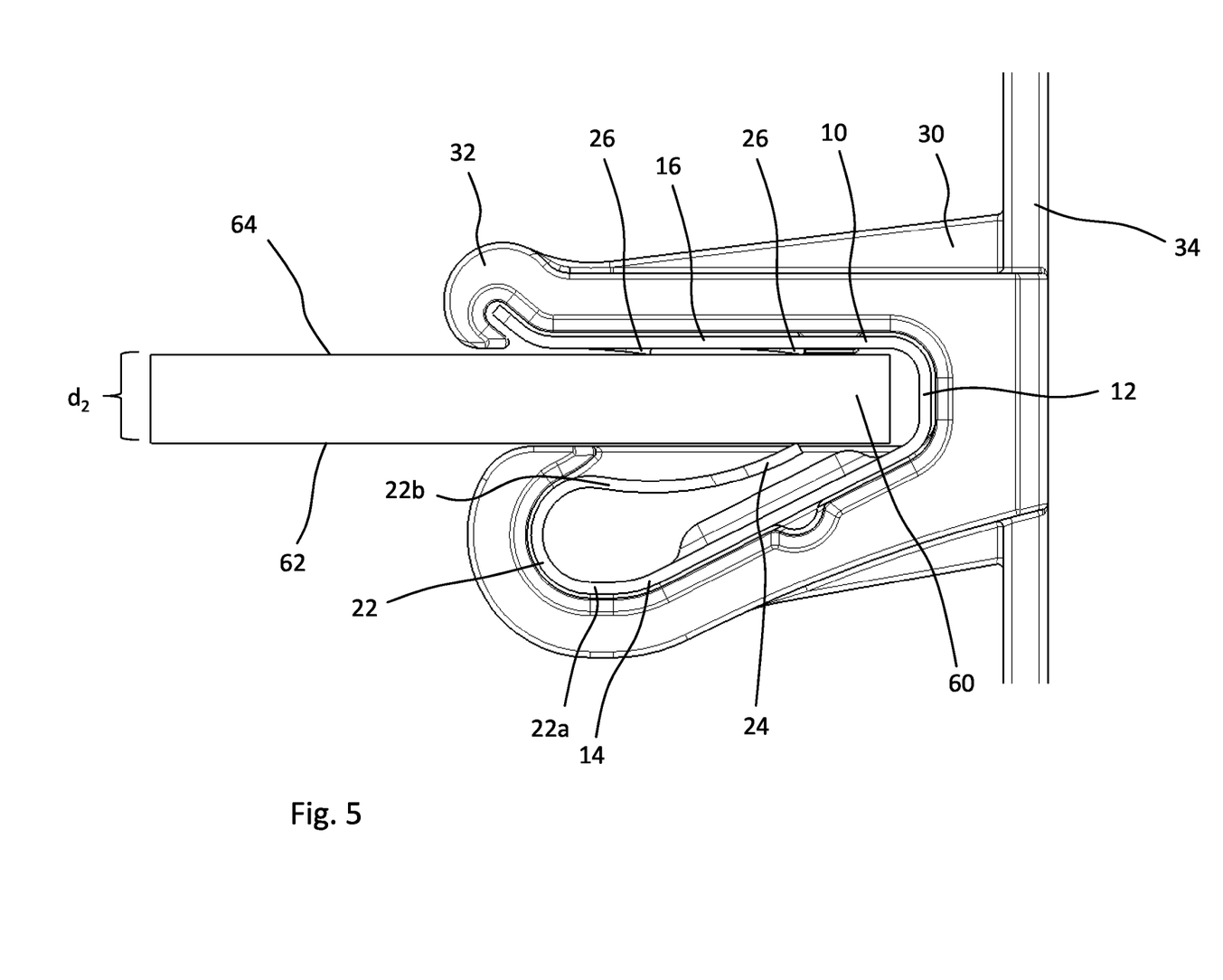
FIG. 5 shows the fastening clip from FIG. 3 with a second carrier edge received in the receiving space.

In FIG. 5, a second carrier edge 60 has been received in the receiving space 18 of the clip body. The carrier edge 60 has a second thickness $d_2$, which is greater than the first thickness $d_1$ of the first carrier edge 50. As a result, the holding sections 22 are deformed to a greater extent. Also the holding projections 26 of the second holding leg 16 are greatly deformed and bent back almost completely into the second holding leg 16. On account of the elasticity achieved by the bending over of the holding sections 22, even the introduction of such a thick carrier edge 60 into the receiving space 18 through the inlet opening 20 is however possible with relatively little mounting force. As compared with known fastening clips, the fastening clip according to the invention however exerts high holding forces on the carrier edge even in the case of such a thick carrier edge. Thus, the second holding projections 26 are in fact deformed so much that it is only at a relatively shallow angle that they act on a second surface 64 of the carrier edge 60. However, on account of the elastic deformation of the holding sections 22, the holding projections 24 are still arranged at quite a steep angle in relation to the first surface 62 of the carrier edge 60. As a result, a good wedging, and consequently a high holding force, continue to be achieved, at least by the holding projections 24. Also, as a result of the great deformation of the holding sections 22 and also of the holding projections 26, a high clamping force acts on the carrier edge 60.

The fastening clip according to the invention consequently allows easy mounting for carrier edges of a wide variety of thicknesses, thanks to low mounting forces and a secure hold thanks to high holding forces, in particular holding forces that are relatively independent of the thickness of the carrier edges.

LIST OF DESIGNATIONS

10 Clip body
12 Main side
14 First holding leg
16 Second holding leg
17 Bearing section
18 Receiving space
20 Inlet opening
22 Holding section
22a Limb
22b Limb
24 Holding projection
26 Holding projection
28 Circular elevations
29 Stiffening rib
30 Line holder
32 Receiving section
34 Carrying section
36 Lateral push-in opening
38 Delimiting wall
39 Niche
40 Transverse groove
50 First carrier edge
52 First surface of the first carrier edge
54 Second surface of the first carrier edge
60 Second carrier edge
62 First surface of the second carrier edge
64 Second surface of the second carrier edge
$d_1$ First thickness
$d_2$ Second thickness

The invention claimed is:

1. A fastening clip for fastening an attachment component on a carrier edge, comprising a clip body with a main side and first and second holding legs which lie opposite one another and extend away from the main side, the first and second holding legs delimiting, together with the main side, a receiving space with an inlet opening for the carrier edge, wherein the first holding leg is adjoined by a holding section having a first bend which is bent over in the direction of the main side of the clip body and has at least one first holding projection with a second bend by such that the at least one first holding projection protrudes into the receiving space in the direction of the second holding leg, wherein the second holding leg, which lies opposite the first holding leg, includes at least one second holding projection which extends in the direction of the first holding leg, wherein the first and second holding legs extend from the main side and away from each other, wherein the first and second holding projections are arranged at different distances from the inlet opening, wherein the second bend follows the first bend such that at least one double bend is produced.

2. The fastening clip according to claim 1, wherein the at least one first holding projection extends from the free end of the holding section.

3. The fastening clip according to claim 1, wherein the holding section extends from the free end of the first holding leg.

4. The fastening clip according to claim 1, wherein the holding section adjoins the first holding leg by way of the first bend which is a U-shaped bend.

5. The fastening clip according to claim 1, wherein the at least one first holding projection and the at least one second holding projection are configured to come into contact at a different spacing from the inlet opening with a carrier edge which is introduced through the inlet opening into the receiving space.

6. The fastening clip according to claim 1, wherein a plurality of bent-over holding sections adjoin the first holding leg, the holding sections in each case having at least one first holding projection.

7. The fastening clip according to claim 6, wherein the first holding projections which are configured on the holding sections are configured to come into contact at a different spacing from the inlet opening with the carrier edge which is to be introduced through the inlet opening into the receiving space.

8. The fastening clip according to claim 1, including a carrying section for supporting the attachment component.

9. A system comprising a carrier edge and a fastening clip according to claim 1, the carrier edge being received in the receiving space of the clip body.

10. The system according to claim 9, wherein the at least one first holding projection and the at least one second holding projection are in contact with the carrier edge at a different spacing from the inlet opening.

* * * * *